INVENTOR.
FRANK A. PAULI

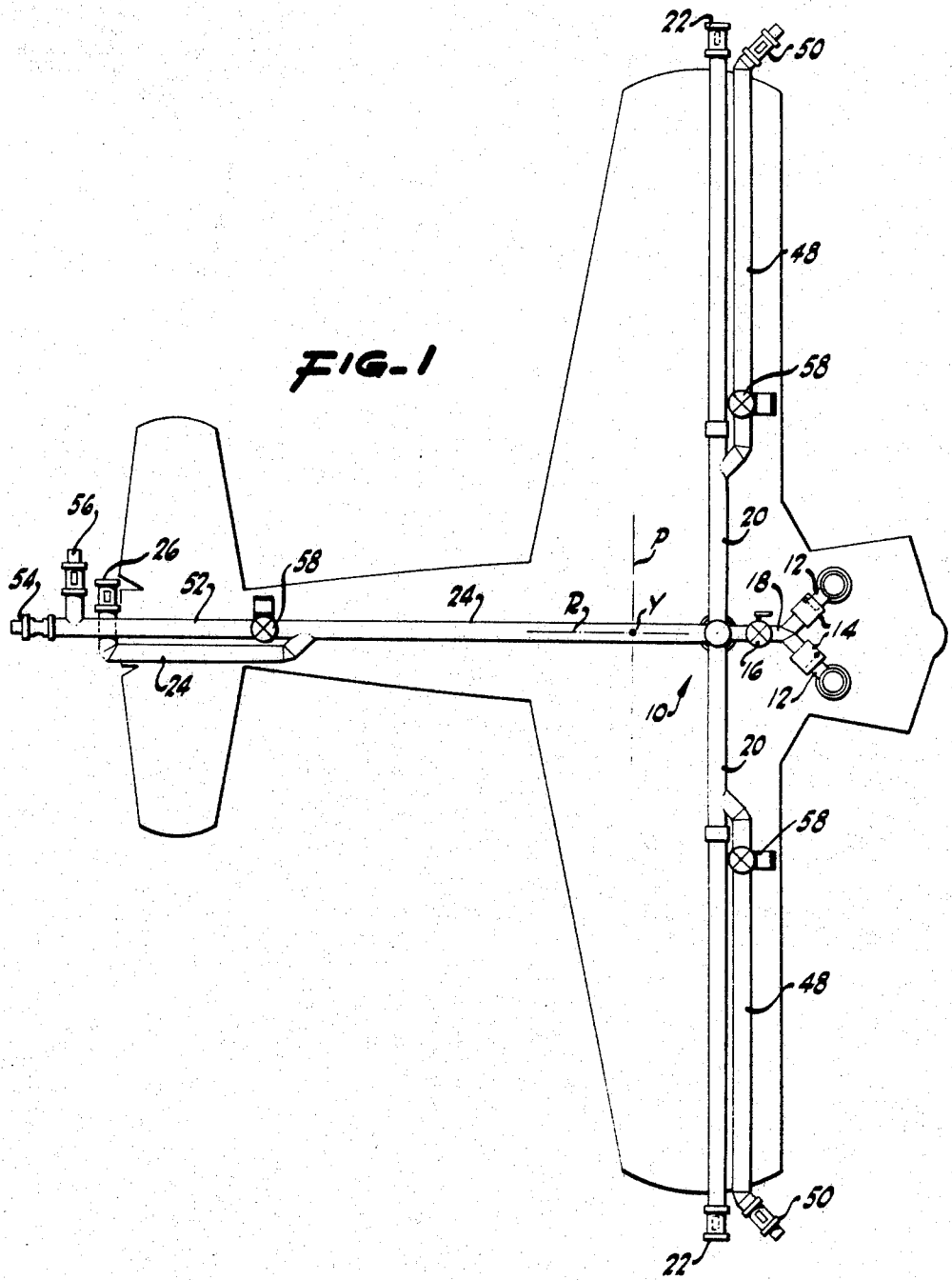

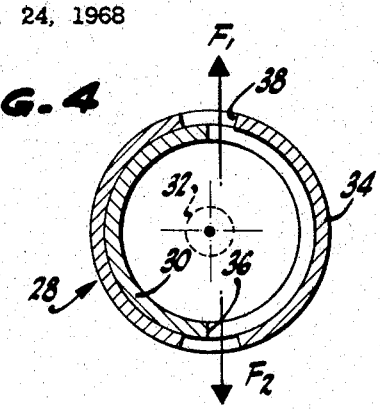
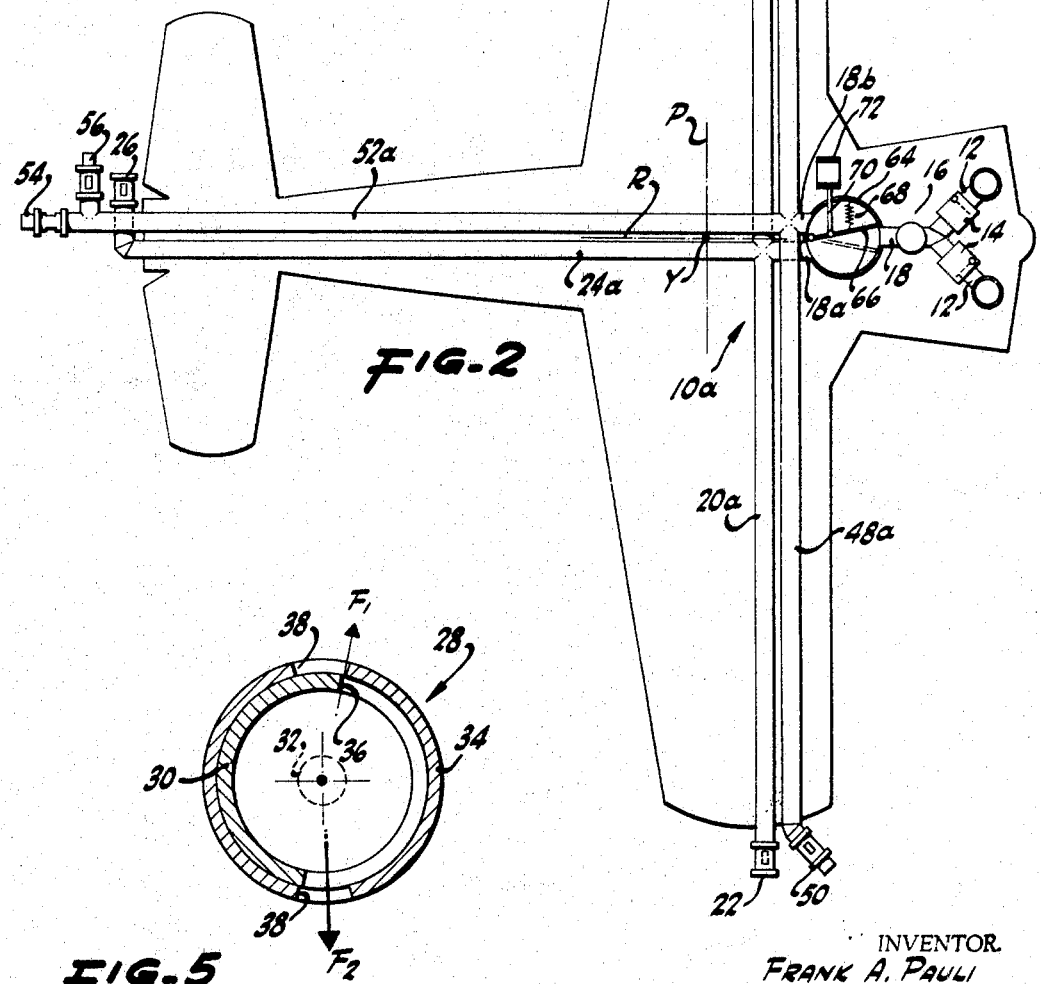
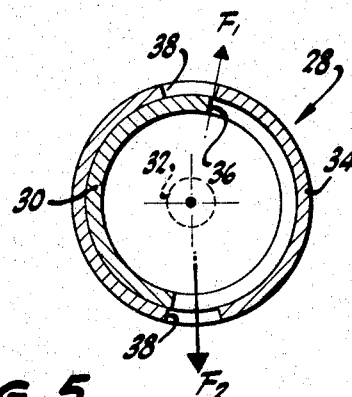

United States Patent Office 3,472,470
Patented Oct. 14, 1969

3,472,470
ATTITUDE CONTROLS FOR VTOL AIRCRAFT
Frank A. Pauli, Los Altos, Calif., assignor to the United States of America as represented by the Administration of the National Aeronautics and Space Administration
Filed Jan. 24, 1968, Ser. No. 700,174
Int. Cl. B64c 13/50, 15/14
U.S. Cl. 244—76            3 Claims

ABSTRACT OF THE DISCLOSURE

Attitude control for VTOL aircraft can be achieved by employing reaction nozzles displaced from various axes of the aircraft. The nozzles are arranged two sets with each set of nozzles being fed by a separate duct system selectively connected to a source of gas under pressure, preferably bled off from a jet engine. For control about each orthogonal axis, nozzles of the first set are controlled mechanically and nozzles of the second set are controlled electrically by servo motors. A valve is interposed between the supply duct and ducts feeding the separate systems and is movable into two positions to supply one or the other system exclusively of the other. Biasing means urges the valve into position for manual control and electrically operated means urges it into position for electrical control. Hence, the system is returned to manual control immediately at pilot option or by failure of the electrical system.

DESCRIPTION

The invention described herein was made by an employee of the U.S. Government and may be manufactured and used by or for the Government for governmental purposes without the payment of any royalties thereon or therefor.

This invention relates to a system for attitude control of VTOL aircraft and, more particularly, to mechanically operated and electrically operated systems working in parallel. In VTOL aircraft, which are designed for vertical flight when landing or taking off, conventional control surfaces are ineffective at the extremely low air speeds encountered while hovering or during the transitional configuration of flight from vertical to horizontal. Therefore, auxiliary means are generally provided to control the attitude of the aircraft about its longitudinal, perpendicular and transverse axes, i.e., to control roll, yaw and pitch. One method accomplishing this is by means of nozzles through which a gas may be jetted, each of the nozzles being displaced from a particular axis in order to produce a moment about that axis to achieve the desired attitude control. In jet VTOL aircraft a conventional source of gas for the nozzles is the jet engine itself with a percentage of the gas, e.g., 10%, being bled off from the compressor of the engine.

Conventionally, the jet nozzles are operated by mechanical connection to the pilot's controls, i.e., the stick and the pedals. However, it is also deemed desirable to have an electrically controlled set of nozzles operated by servo motors, wherein other signals, including those from sensing devices which are energized according to the response of the aircraft to the attitude change command, will modify the input signal directed to the servo motor from the pilot's controls and, hence, facilitate attitude correction. This also gives freedom to obtain desired control system characteristics. According to present methods under which such electrically controlled servo systems are operated, it is necessary either to inactivate the mechanically controlled nozzles by physically disconnecting them from the pilot-operated controls or to use complicated systems for combining the two systems. The outputs of the mechanically controlled and the electrically actuated nozzles produce independent forces and so they may be added or they may work in conflict. When they are working in conflict there is little effective control power available to the pilot. Even if not in conflict, the additional effect presents a disadvantage in that there is a variance in the amount of control input required for a given attitude maneuver when the pilot is operating solely by mechanical controls than when operating with the combined mechanical and electrical systems.

There are obvious disadvantages in physically disconnecting the pilot controls from the mechanical system in that such mechanical disconnects require pilot time and effort and can be hazardous under emergency conditions when they are needed most. Even electrically actuated disconnects may be slow because a high gear ratio may be necessary in order to get sufficient power to actuate the disconnecting means. Moreover, even with the mechanical system disconnected from the pilot the same amount of air is flowing to the mechanically driven nozzles and the additional operation of the electrically controlled servo system results in a greatly increased consumption of bleed air from the jet engine.

It is, therefore, an object of this invention to provide a VTOL aircraft attitude control system utilizing both electrically and mechanically controlled jet nozzles which may be operated from the same pilot input without interference.

It is a further object of this invention to minimize bleed air consumption by providing both mechanically and electrically operated jet VTOL aircraft attitude control systems which are operated in the alternative.

It is a further object of this invention to minimize bleed air consumption so as to gain greater control power and offset the effects of the pilot's mechanical input.

It is a further object of this invention to provide mechanical and electrical control systems for a VTOL aircraft wherein the mechanical control system may be inactivated and reactivated without delay.

It is a further object of this invention to provide mechanical and electrical control systems for a VTOL aircraft wherein failure of the electrical system will result in immediate reactivation of the mechanical control system.

In carrying out this invention, I provide a series of mechanically controlled jet nozzles, each of which is displaced from a given axis of the aircraft in order to produce a moment about that axis for attitude control, all of the mechanically controlled nozzles being connected to a fluid conduit system. I also provide a separate fluid system including nozzles which are operated electrically by servo motors. A valve means is interposed between a supply conduit from the source of pressurized gas, e.g., bleed air from a jet engine, and separate feed lines to the two systems. The valve means is constructed and arranged so that either one system or the other, but not both, are connected to the supply system and yieldable means, such as a strong spring, normally urges the valve into position connecting the source with the mechanically operated system. Electrically energized means, such as a solenoid may be operated selectively to overcome the spring and move the valve means into position to connect the supply to the electrically operated nozzles. Hence, in the event of electrical failure, or at the option of the pilot, the valve means is immediately shifted to bring the aircraft under mechanical control.

Other objects and advantages of this invention will become apparent from the description following when read in conjunction with the accompanying drawings wherein:

FIG. 1 is a schematic illustration of a previous air distribution system for attitude control of a VTOL aircraft;

FIG. 2 is a schematic illustration of an air distribution system according to a feature of this invention;

FIGS. 4 and 5 are schematic cross-sectional views of a double-acting air nozzle;

Figure 3:
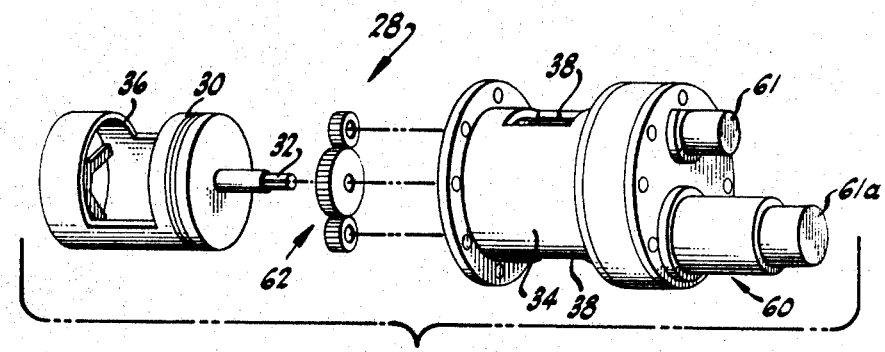
FIG. 3 is an exploded view of a nozzle to be utilized in conjunction with my air distribution system.

Referring now to FIG. 1, there is illustrated an air distribution system 10 for controlling the attitudes of an aircraft about its three orthogonal axes P, R and Y about which the pitch, roll and yaw attitudes of the aircraft are controlled. A satisfactory source of the pressurized air is the compressor of a jet engine (not shown) from which air under pressure is delivered into intake ducts 12 in which check valves 14 are interposed to prevent reverse flow. A manually operated air shut-off valve 16 is also provided in a manifold line 18 in order to inactivate the system when the VTOL aircraft has passed through the hovering and transitional stages and reaches sufficient air speed that conventional air control surfaces (not shown) may be operated to control the attitude of the aircraft.

From the manifold line 18, branch lines 20 extend outward along the wings of the aircraft to mechanically operated roll and yaw control nozzles 22 at the ends of the wings and a longitudinal duct 24 terminates in a pitch control nozzle 26 at the tail of the aircraft. All of the nozzles thus far described are controlled manually from conventional pilot controls through any suitable mechanical linkage or drive (not shown).

Referring now to FIGS. 3, 4 and 5, I have shown a suitable jet control nozzle 28 wherein a rotor 30 is mounted on shafts 32 to turn within a housing or stator 34 and bring a large port 36 which extends around and through a substantial portion of the rotor into various degrees of alignment with diametrically opposite ports in the stator 34. The nozzle is double acting and produces reaction forces $F_1$ and $F_2$. In FIG. 4 these forces are approximately equal and no moment is created to alter the attitude about the axis on which the nozzle acts, whereas in FIG. 5 the force $F_2$ is greater, producing a net reaction force in the opposite direction to generate a movement about the appropriate aircraft axis.

Figure 6:
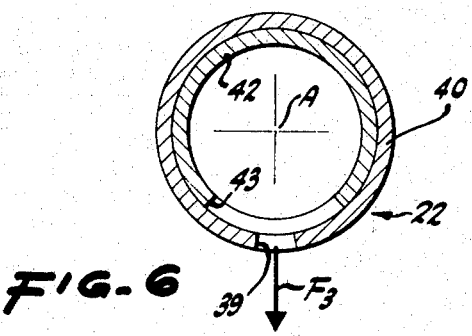
FIGS. 6 and 7 are schematic cross-sectional views of a single-acting air nozzle used in the systems of FIGS. 1 and 2.
Figure 7:
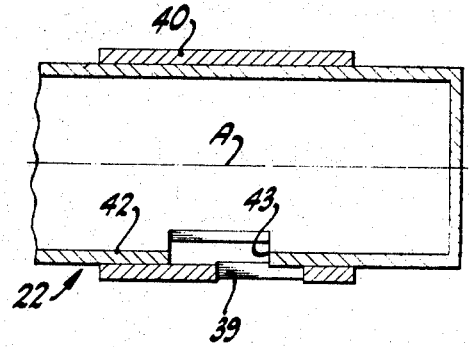

Under certain circumstances, such as in the case of the nozzles 22 in FIG. 1, it is desirable to have more than one attitude controlled by a single nozzle or pair of nozzles. In such instance, the nozzles are preferably made single acting, as shown in FIGS. 6 and 7, to produce a reaction force selectively in one of two transverse directions. Preferably, the nozzle opening 39 is normally directed downward for control of roll attitude with the nozzle 39 being opened by movement of the nozzle rotor 40 along the axis A (FIG. 7) relative to the stator 42 to vary the alignment of the nozzle 39 with respect to the stator opening 43. For example, for right roll input the left wing control rotor 40 slides axially to open the downwardly directed nozzle 39 and the right wing nozzle control 40 slides toward a closed position. This produces a net reaction force $F_3$ which rolls the left wing tip up and the right wing tip down.

Then, for control of yaw, the rotors 40 are rotated in opposite directions about the axis A. Thus, if the left nozzle is rotated to the rear and the right nozzle is rotated forwardly, the net force component will yaw the aircraft to the right about the Y axis in FIG. 1. Hence, the force vector is altered by rotation of the rotor 40 and the amplitude is varied by longitudinal movement. Since the nozzle rotates only about 45° in either direction from a vertical axis, a downward force is imparted at each nozzle. As the force components parallel to the Y axis are equal and opposite, no roll about axis R is produced.

Referring again to FIG. 1, electrical control of the aircraft is achieved by branch lines 48 in the wings opening into the main lateral lines 20 and terminating in a servo-operated roll nozzle 50. Another branch line 52 is provided at the tail to feed two nozzles 54 and 56 to control yaw and pitch, respectively. Each of the servo-controlled nozzle branch lines have interposed therein a motorized air shut-off valve 58 so that the pilot may selectively operate the aircraft attitude control nozzles by mechanical control or by mechanical control augmented by electrical servo-motor control 60 through suitable drive means 62, both shown generally in FIG. 3. Since the mechanical control is operative at all times, it is obvious that concurrent use of the servo control by opening the branch line valves 58 results in an increased demand upon the compressed air supply.

Figure 8:
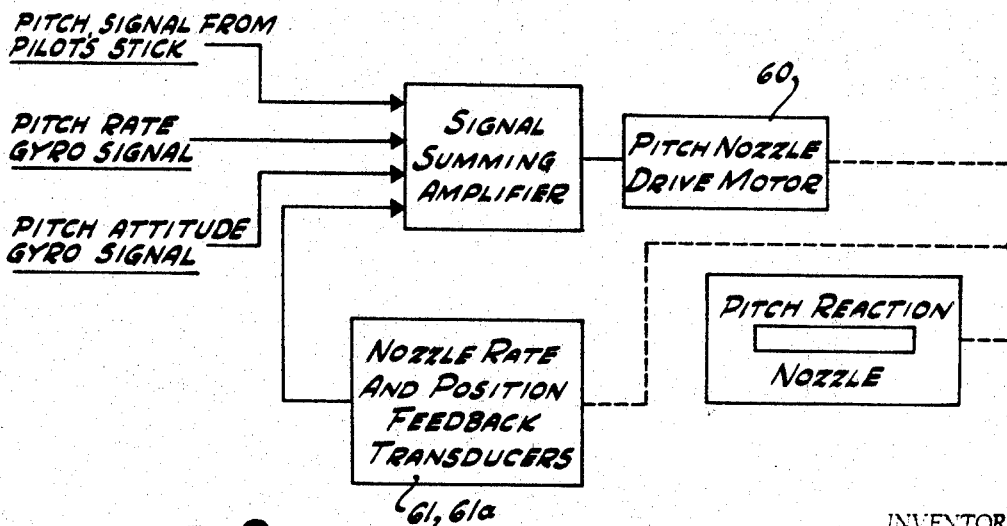
FIG. 8 is a schematic diagram of control circuits for electrical control system.

In FIG. 8 there is shown a schematic illustration in block form of a servo system for control of pitch to demonstrate that the nozzle drive motor 60 is operated by signals influenced, not merely by pilot output but by aircraft attitude and response as well as nozzle position and rate of response with appropriate transducers 61 and 61a delivering the signal from the drive train (FIG. 3).

Referring now to FIG. 2, I have illustrated an improved system 10A wherein the mechanically controlled wing-tip roll and yaw control nozzles 22 and the trailing pitch control nozzle 26 are connected together in a separate conduit system 20a, 24a with a control valve housing 64 connected between the supply duct 18 and the mechanical control system line 18a. Also connected to the control valve housing 64 is feed line 18b for a separate, interconnected fluid system 48a, 52a which includes the servo roll control nozzles 50 at the wing tips and servo controlled yaw and pitch nozzles 54 and 56 at the tail. The control valve means 64 may be of a variety of type but should be operative to connect the supply duct 18 selectively to either the mechanically controlled system 20a, 24a or the electrically controlled system 48a, 52a, but not both simultaneously. Suitable for this purpose is a disc valve having a disc 66 which is pivoted to the housing 64 and movable from the position shown in FIG. 2 in solid lines to that shown in phantom. A powerful tension spring 68 normally biases the disc into the position shown but the spring may be overcome by an actuator 70 connected to the disc and operated by suitable electrical means such as a solenoid 72. Hence, simply by operating a simple switch, the operator may quickly shift from a mechanical to an electrical operation and, in the event of electrical failure, the spring 68 will overcome the solenoid 72 and immediately move the valve actuator 70 to shift the valve disc 66 into position for operation of the mechanically controlled system 20a, 24a.

While this invention has been described in conjunction with preferred embodiment thereof, it is obvious that modifications and changes therein may be made by those skilled in the art without departing from the spirit and scope of this invention as defined by the claims appended hereto.

What is claimed as invention is:

1. An attitude control system for a piloted VTOL aircraft comprising:

a gas source;

a first set of jet nozzles for producing reaction forces about the roll, yaw, and pitch axes of said aircraft, said nozzles being adapted for response to manual pilot commands;

a first conduit common to said set of nozzles;

a second set of jet nozzles for producing reaction forces about said roll, yaw, and pitch axes of said aircraft;

a second conduit common to said second set of jet nozzles;

servo means for operating said nozzles of said second set;

a valve coupled between said first and second conduits and said gas source;

an actuator for operating said valve and movable into first and second positions to operate said valve and connect said gas source to said first conduit and said second conduit, respectively;

yieldable means normally biasing said actuator into said first position;

electrically operated means connected to said actuator and operable when energized to overcome said yieldable means and move said actuator into said second position;

said gas source being connected to said first conduit when said actuator is in said first position, and connected to said second conduit when said actuator is in said second position.

2. A control system as claimed in claim 1 wherein said first set comprises a first nozzle, a second nozzle, and a third nozzle, said first nozzle being adapted to produce reaction forces about said pitch axis, and said second and third nozzles being adapted to produce reaction forces about said yaw axis and said roll axis.

3. A control system as set forth in claim 1 wherein said servo means includes a drive motor connected to each nozzle of said second set, and each motor is responsive to pilot command signals, aircraft rate signals, aircraft attitude signals, and feedback signals which are a function of nozzle rate and position.

References Cited

UNITED STATES PATENTS

| | | | |
|---|---|---|---|
| 2,870,978 | 1/1959 | Griffith et al. | 244—75 X |
| 2,974,594 | 3/1961 | Boehm | 244—76 |

FOREIGN PATENTS

| | | |
|---|---|---|
| 1,268,427 | 6/1961 | France. |

ANDREW H. FARRELL, Primary Examiner.